Patented Oct. 17, 1944

2,360,394

UNITED STATES PATENT OFFICE 2,360,394

ALCOHOL-REACTION CATALYSTS

Harry Burrell, Paramus, N. J., assignor, by mesne assignments, to Heyden Chemical Corporation, New York, N. Y., a corporation of Delaware No Drawing. Application March 9, 1942,
Serial No. 433,942

19 Claims. (Cl. 260—410.6)

This application is a continuation in part of my copending application Serial No. 382,586, filed March 10, 1941.

It is an object of this invention to promote the reactions of alcohols including such reactions as alcoholysis, esterification and etherification. There is a further object to aid the reaction of polyhydric alcohols, especially pentaerythritol and polypentaerythritols, and other polyhydric primary alcohols.

In the manufacture of pentaerythritol by the condensation of acetaldehyde and formaldehyde, in addition to the pentaerythritol itself, smaller amounts of hydroxylated substances are also obtained. One of these obtained in a considerable amount is dipentaerythritol, which is an ether of the following structure:

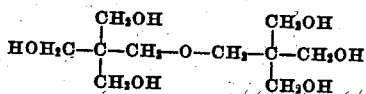

(See Brun, "Über den Dipentaerythritol," Wilhelm Greven, Krefeld, 1930.) Another hydroxylated substance, obtained in somewhat smaller amounts, is white and crystalline, melts at 230-240° C. and has a hydroxyl content of 33%. The chemical structure of this substance is not known, and there is a possibility that it may be a mixture of chemical entities. It seems fairly certain, however, that it is related to dipentaerythritol in that it contains pentaerythritol residues bound by ether linkages. Regardless of chemical structure, for purposes of definition in this specification and in the claims, this substance will be termed "pleopentaerythritol". The term is not intended to indicate that the substance is formed either actually or theoretically by combination of any particular number of pentaerythritol residues, but merely signifies that it is probably a product similar to pentaerythritol and dipentaerythritol.

Dipentaerythritol and pleopentaerythritol may be grouped together under the generic term "polypentaerythritols."

By "polypentaerythritols" I mean those compounds of higher molecular weight than pentaerythritol which are formed either actually or theoretically by etherifying one or more of the hydroxyl groups of pentaerythriotol with a polyhydric alcohol. These polypentaerythritols therefore have either the same number of hydroxyl groups as pentaerythritol (as for instance when an ether is formed between pentaerythritol and a glycol or with pentaerythritol and ethylene oxide); or the polypentaerythritols may have a greater number of hydroxyl groups than pentaerythritol, that is to say five or more (as for instance when an ether is formed between two or more molecules of pentaerythritol, or with pentaerythritol and glycerol, etc.).

In the reactions of pentaerythritol, polypentaerythritols, and other high melting alcohols, difficulties are frequently encountered because of the presence of two or more phases which exist when the alcohols are insoluble in the reaction mixture, or when the alcohols are solids at the reaction temperature. Under such conditions the reaction temperatures ordinarily must be higher and the reaction times longer with the resulting disadvantages in economy, discoloration, losses of yield, etc. By using certain catalysts as hereinafter described, such difficulties are minimized.

By means of my invention it is possible to promote the replacement of part of the alcohol residues in esters by pentaerythrityl or polypentaerythrityl groups. It is further possible to promote the alcoholysis of naturally occurring esters such as fatty acid glycerides. It is also possible to prepare hydroxylated partial esters suitable for further reactions, for example, with dibasic acids for the preparation of alkyd resins or for further reaction with monobasic acids such as fatty acids in order to prepare fatty oils, especially the drying oils. Furthermore, the esterification of such hydroxylated partial esters and also of the original unesterified alcohols is also promoted by the catalysts. It is convenient, for example, in the preparation of alkyd resins, to add the catalyst at the start of a series of reactions and to allow the catalyst to remain in the reaction mixture so that alcholysis and esterification are successively or simultaneously promoted.

It is known that oxides and hydroxides as well as some alcoholates of alkali metals and the alkaline earth metals will promote alcoholysis. Lead oxide or litharge has also been frequently used. These substances are not satisfactory for many uses. The alkali metal oxides form soaps which are deleterious to the weathering properties and to the clarity of alkyd resins and drying oils prepared with their aid. The alkaline earth metal oxides cause excessive foaming during the alcoholysis reaction and are frequently too insoluble to be effective. Litharge promotes the formation of color bodies and in the amounts required for alcoholysis causes an undesirable siccative action. This is especially true in the case of pentaerythritol esters of drying oil acids where the use of lead oxide leads to the formation of brittle films and also causes excessive darkening of the pentaerythritol drying oils, thereby limiting their use in light colored paints and varnishes.

It has now been found that the ester soluble salts of certain elements of periodic groups I, II and IV are active alcohol-reaction promoters. These salts may be naphthenates, stearates, oleates, linoleates, abietates, resinates or salts of certain other acids known to impart oil solubility. The elements of group IV which were found to be active are lead and cerium, but these generally produce highly discolored products, especially with pentaerythritol type alcohols. The element of group I which was found to be active was lithium. The preferred elements, therefore, are lithium and those of group II with the exception of beryllium, magnesium and mercury (the status of radium is not known) namely: calcium, strontium, barium, zinc and cadmium.

The method of using these metallic salts as alcoholysis catalysts is described in the copending application, 382,586, and also in the following examples. In general, 1 or 2% of the catalysts may be added to the reaction mixture and the reaction carried out in the usual fashion with due regard for the increased reactivity of the system. As esterification catalysts they may simply be added to the esterifying ingredients again with proper concern for the increased speed of reaction.

The following examples are given for illustrative purposes only and should not be construed so as to limit the invention as to proportion and scope.

*Example 1.*—The following table illustrates the variety of salts suitable for use as alcoholysis catalysts. The procedure for utilizing each of the substances listed was as follows: 200 parts by weight of alkali refined soy bean oil and the catalysts amounting to 1% of the weight of oil were heated with 48 parts of technical pentaerythritol at 230° C. Alcoholysis was considered complete when the pentaerythritol had completely dissolved. If the pentaerythritol did not dissolve after heating for three hours at 230° C., the metallic salt was considered inactive as a catalyst.

*Table I*

Among the salts which were found to promote alcoholysis and which may be used in Example I were:

Lithium naphthenate
Calcium naphthenate
Lead naphthenate
Barium naphthenate
Cerium naphthenate
Calcium stearate
Zinc stearate
Calcium resinate
Strontium resinate
Cadmium resinate
Calcium soy oil soap
Calcium linoleate

*Example 2.*—To illustrate the general applicability of the catalysts as alcoholysis promoters, soy bean oil was heated with 1% of calcium naphthenate and 25% of the alcohols listed in Table II, at 230° C.

*Table II*

| Alcohol used | Time required to effect alcoholysis |
| --- | --- |
| | Minutes |
| Glycerol | 60 |
| Trimethylol propane | ½ |
| Tetraethylene glycol | 2 |
| Ethylene glycol | 1 |
| Butanol | (1) |
| Dipentaerythritol | 13 |
| Pentaerythritol | 5 |
| Pleopentaerythritol | 50 |

[1] The butanol mixture was heated under reflux for 6 hrs. during which time the temperature rose from 124 to 134° C. The excess butanol was then distilled off and 26% was found to have reacted.

*Example 3.*—As an illustration of other esters besides those naturally occurring in soy bean oil, to which the invention may be applied, Table III lists the time required to alcoholize the noted ester by the alcohol indicated when 1% calcium naphthenate was added to the ester and the reaction mixture heated at 230° C.

*Table III*

| Ester used | Alcohol used | Time required |
| --- | --- | --- |
| | | Minutes |
| Cotton seed oil (glyceride) | Pentaerythritol, technical | 9 |
| Tung oil (glyceride) | do | 8 |
| Linseed oil (glyceride) | Pentaerythritol, pure | 8 |
| Pentaerythritol tetraacetate | Pentaerythritol, technical | 14 |
| Pentaerythritol (technical) tetrastearate | Glycerol | 20 |

*Example 4.*—150 parts alkali-refined soy bean oil, 3 parts calcium naphthenate, and 37.5 parts technical pentaerythritol were heated together in an apparatus fitted for stirring the reactants under an inert atmosphere. The ingredients were heated from room temperature up to 250° C. in 31 minutes, at which time the pentaerythritol had substantially completely reacted. The reaction product was immediately cooled to 128° C. when 73 parts of phthalic anhydride were added, and the mixture was further reacted at 250° C. for 3.75 hours. The product was an alkyd resin which had a Gardner color of 7 when dissolved in an equal weight of toluol.

*Example 5.*—150 parts of alkali-refined soy bean oil and 37.5 parts technical pentaerythritol were heated in the absence of calcium naphthenate to 280° C. at which temperature the pentaerythritol had not yet reacted. Some of the pentaerythritol had sublimed on the upper walls of the reaction vessel, some had melted and formed a liquid layer at the bottom, and a small amount had dispersed to form a cloudy suspension in the hot oil. It was necessary to continue heating at 275–280° C. for 31 minutes with vigorous agitation before the pentaerythritol had reacted.

This product was also made into an alkyd resin following the same procedure as in Example 4 and the resultant resin had a Gardner color of 9 when dissolved in an equal weight of toluol.

*Example 6.*—150 parts alkali-refined soy bean oil, 37.5 parts technical pentaerythritol and 0.38 part litharge were heated under an inert atmosphere to 250° C. in 36 minutes. At this point the pentaerythritol had reacted but the resulting alcoholized soy bean oil was extremely dark colored. The product was cooled and reacted with phthalic anhydride as in Example 4. The resultant alkyd resin had a Gardner color of 11 when dissolved in an equal weight of toluol.

*Example 7.*—150 parts of alkali-refined soy bean oil, 15 parts purified dipentaerythritol, 3.0 parts calcium naphthenate and 32 parts high flash petroleum naphtha were heated under reflux to 246° C. in 39 minutes. The temperature was then lowered to 92° C. and 100 parts of linseed oil fatty acids were added. The reaction mixture was further heated at 260° C. for 2 hours allowing the high flash naphtha to distill off and carry with it by azeotropic distillation the water which was separated in a trap and drawn off while the high flesh naphtha was returned to the reaction mixture. When substantially the theoretical amount of water had distilled off, the temperature of the reaction mixture was raised to 310° C. to distill off the high flash naphtha. The product was a light brown viscous oil consisting of mixed soy bean oil fatty acid and linseed oil fatty acid esters of glycerol and dipentaerythritol.

*Example 8.*—The following Table IV illustrates the reaction speed of an esterification with and without calcium naphthenate. The ingredients for the reactions consisted of 1200 parts by weight of linseed oil fatty acids and 148 parts by weight of (mono-) pentaerythritol with 40 parts by weight of a petroleum distillate known as "Solvesso No. 1." The purpose of the petroleum distillate was to azeotropically remove water of esterification. In one case these ingredients were heated under reflux at 200° C. without any further additions and in the other case 12 parts by weight of calcium naphthenate were added to the reaction mixture. The table shows the change in acid number with time at 200° C.

Table IV

| Heating time, minutes | Acid number, no catalyst | Acid number, 1% calcium naphthenate added |
| --- | --- | --- |
| 22 | 82.1 | 68.9 |
| 42 | 66.0 | 58.2 |
| 62 | 56.8 | 49.7 |
| 82 | 52.1 | 44.1 |
| 103 | 46.7 | 38.4 |
| 121 | ------ | 27.6 |
| 181 | 35.8 | ------ |

The reactions were of the second order and the equation for reaction rate may be placed in the form, $$K = \frac{a-b}{tb}$$

where $K$ is the reaction constant, $a$ is the initial acid number, $b$ is the acid number after time $t$. Using this equation, $K$ for the esterification reaction without a catalyst is 0.0099 while $K$ for the esterification with the 1% calcium naphthenate is 0.0225. It may thus be seen that the use of calcium naphthenate as a catalyst increases the reaction rate 2.27 times.

It may readily be seen from the examples that the ester-soluble salts of lithium, calcium, strontium, barium, zinc, and cadmium are powerful promoters for reactions of alcohols, particularly primary alcohols. This is especially valuable in the reactions utilizing pentaerythritol-type alcohols, because the high melting point and general insolubility militates against satisfactory reaction rates.

Having thus described my invention, what I claim as new and desire to secure by Letters Patent is:

1. The process of promoting alcoholysis with pentaerythritol which includes effecting the reaction in the presence of an ester-soluble salt of a metal selected from the group consisting of lithium, calcium, strontium, barium, zinc, and cadmium.

2. The process which includes promoting alcoholysis with polypentaerythritols by the action of an ester-soluble salt of a metal selected from the group consisting of lithium, calcium, strontium, barium, zinc, and cadmium.

3. The process which includes promoting the esterification of pentaerythritol by an ester-soluble salt of a metal selected from the group consisting of lithium, calcium, strontium, barium, zinc, and cadmium.

4. The process which includes promoting the esterification of polypentaerythritols in the presence of an ester-soluble salt of a metal selected from the group consisting of lithium, calcium, strontium, barium, zinc, and cadmium.

5. The process of alcoholizing an ester with an alcohol, which includes heating them in the presence of an ester-soluble salt of a metal selected from the group consisting of lithium, calcium, strontium, barium, zinc, and cadmium.

6. The process of alcoholizing a fatty acid ester of glycerol with an alcohol selected from the group consisting of pentaerythritol, polypentaerythritols and mixtures thereof, which includes heating them in the presence of an ester-soluble salt of a metal selected from the group consisting of lithium, calcium, strontium, barium, zinc, and cadmium.

7. The process which includes promoting the esterification of alcohols which includes effecting said esterification in the presence of an ester-soluble salt of a metal selected from the group consisting of lithium, calcium, strontium, barium, zinc, and cadmium.

8. The process which includes promoting alcoholysis with a mixture of pentaerythritol and a polypentaerythritol by an ester-soluble salt of a metal selected from the group consisting of lithium, calcium, strontium, barium, zinc, and cadmium.

9. The process which includes promoting the esterification of a mixture of pentaerythritol and a polypentaerythritol by an ester-soluble salt of a metal selected from the group consisting of lithium, calcium, strontium, barium, zinc, and cadmium.

10. The process which includes alcoholizing a fatty acid ester of glycerol with a mixture of pentaerythritol and a polypentaerythritol in the presence of an ester-soluble salt of a metal selected from the group consisting of lithium, calcium, strontium, barium, zinc, and cadmium.

11. The process which includes heating together a fatty acid ester of glycerol with a mixture of pentaerythritol and a polypentaerythritol in the presence of an ester-soluble salt of a metal selected from the group consisting of lithium, calcium, strontium, barium, zinc, and cadmium.

12. The process of alcoholizing an ester which includes promoting the alcoholysis by an ester-soluble salt of a metal selected from the group consisting of lithium, calcium, strontium, barium, zinc, and cadmium.

13. The process of alcoholizing a fatty acid ester of glycerol with an alcohol selected from the group consisting of pentaerythritol, polypentaerythritols and mixtures thereof, which consists in reacting them in the presence of zinc naphthenate as a catalyst.

14. The process of alcoholizing an ester which includes promoting the alcoholysis by an ester-soluble stearate of a metal selected from the group consisting of lithium, calcium, strontium, barium, zinc, and cadmium.

15. The process of alcoholizing an ester which includes promoting the alcoholysis by an ester-soluble resinate of a metal selected from the group consisting of lithium, calcium, strontium, barium, zinc, and cadmium.

16. The process of alcoholizing an ester which includes promoting the alcoholysis by an ester-soluble naphthenate of a metal selected from the group consisting of lithium, calcium, strontium, barium, zinc, and cadmium.

17. The process of alcoholizing soy bean oil with an alcohol selected from the group consisting of pentaerythritol, polypentaerythritol and mixtures thereof, which includes reacting them in the presence of an oil soluble salt of lithium, calcium, strontium, barium, zinc, and cadmium.

18. The process of alcoholizing linseed oil with an alcohol selected from the group consisting of pentaerythritol, polypentaerythritol and mixtures thereof, which includes reacting them in the presence of an oil soluble salt of lithium, calcium, strontium, barium, zinc, and cadmium.

19. The process of alcoholizing linseed oil with pentaerythritol, which includes reacting them in the presence of a resinate of a metal selected from the group consisting of lithium, calcium, strontium, barium, zinc and cadmium.

HARRY BURRELL.